United States Patent [19]

Schiele

[11] Patent Number: 5,516,067
[45] Date of Patent: May 14, 1996

[54] FITTINGS FOR A TRUCK BOX ENCLOSURE

[76] Inventor: Jim D. Schiele, 1092 S. 69th St., Springfield, Oreg. 97478

[21] Appl. No.: 223,227

[22] Filed: Apr. 5, 1994

[51] Int. Cl.⁶ .................................................. A47B 96/06
[52] U.S. Cl. ................................ 248/220.21; 248/202.1; 248/222.11
[58] Field of Search .......................... 248/201.1, 222.1, 248/289.1, 220.2; 296/3, 34, 36, 43, 50–56, 57.1; 211/187, 189, 190, 208; 403/49, 187, 231, 407.1, 163

[56] References Cited

U.S. PATENT DOCUMENTS

| | | | |
|---|---|---|---|
| 229,029 | 6/1880 | Brickett | 296/53 |
| 2,080,764 | 5/1937 | Crawford | 296/10 |
| 2,447,128 | 8/1948 | Logan | 248/289.1 |
| 2,947,566 | 8/1960 | Tower | 296/10 |
| 3,168,793 | 2/1965 | Gibson | 52/655.1 |
| 3,450,426 | 6/1969 | Kellems | 403/231 |
| 3,879,143 | 4/1975 | Gostling | 403/49 |
| 3,986,317 | 10/1976 | Mountz | 52/753 |
| 4,197,952 | 4/1980 | De Fouw et al. | 403/263 |
| 4,329,811 | 5/1982 | Coulson | 403/263 |
| 4,703,969 | 11/1987 | Rayburn | 296/3 |
| 4,895,548 | 1/1990 | Holland et al. | 52/655.1 |
| 5,071,185 | 12/1991 | Schiele | 296/3 |
| 5,193,697 | 3/1993 | Lubczyk et al. | 211/208 |

FOREIGN PATENT DOCUMENTS 857075  12/1957  United Kingdom ................... 403/407

Primary Examiner—Karen J. Chotkowski
Assistant Examiner—Gwendolyn Wrenn
Attorney, Agent, or Firm—James D. Givnan, Jr.

[57] ABSTRACT

An enclosure with fittings removably coupling enclosure members with the fittings being formed from plate stock. Insert fittings each include a leg member insertable into a socket fitting having a triangularly shaped socket in which the leg member is received in a snug manner. An apex portion of the socket fitting is slidably received in an elongate slot of the insert fitting.

1 Claim, 1 Drawing Sheet

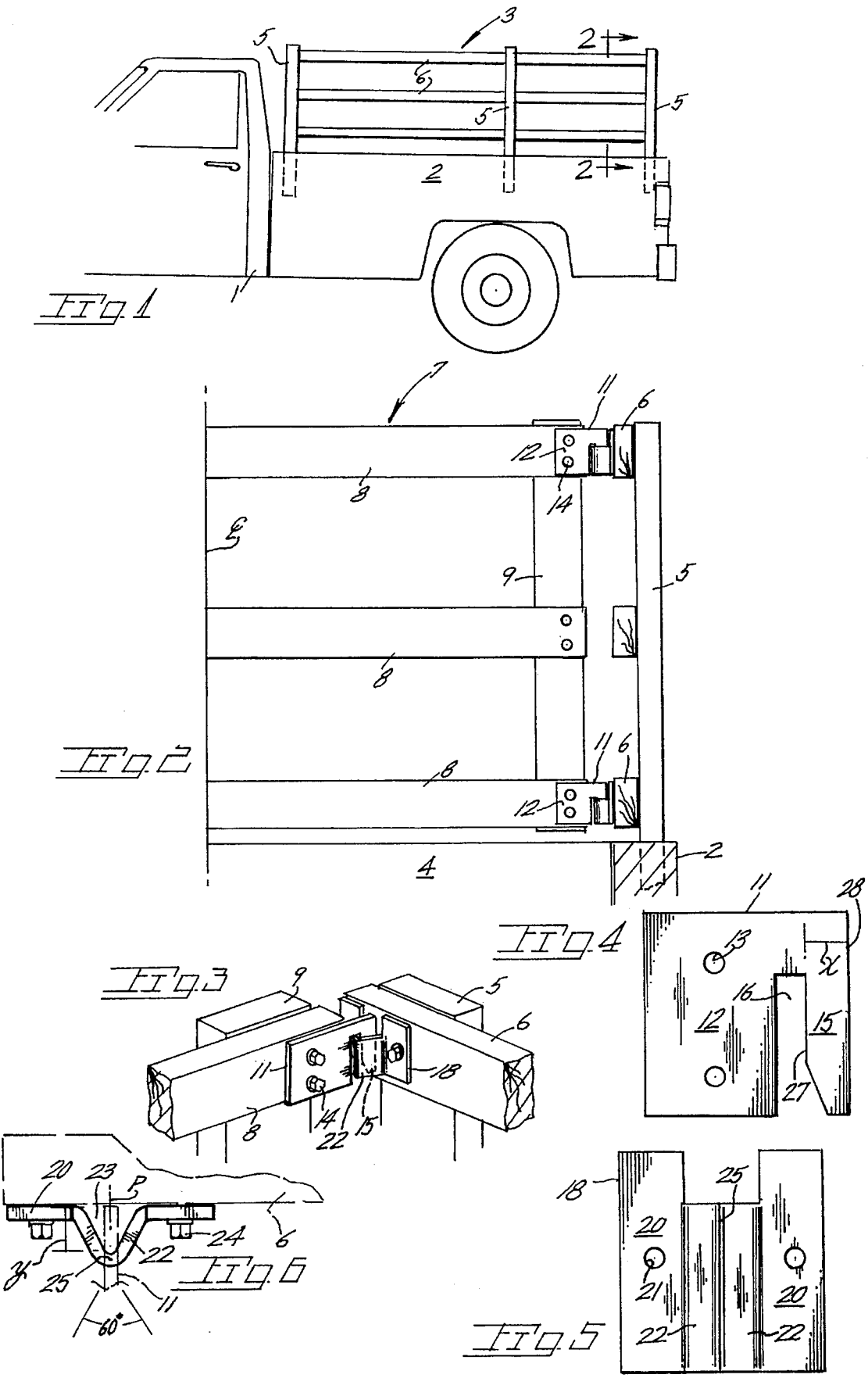

FITTINGS FOR A TRUCK BOX ENCLOSURE

BACKGROUND OF THE INVENTION

The present invention pertains generally to assembled enclosures located about the box of a pickup truck or the bed of a flat bed truck to increase load capability.

U.S. Pat. No. 5,071,185 issued to the present inventor discloses an enclosure utilizing metal fittings to join front and rear closures with the sides of the enclosure. Fittings on the ends of enclosure cross and side members include pins which are removably engageable with sockets carried by corner posts of the enclosure. The metal fittings do not lend themselves to being formed from plate stock by a shaping operation.

A survey of prior patents disclosing truck bed or box enclosures indicates that the fittings utilized for joining the enclosure members in detachable fashion are not capable of low cost manufacture nor lend themselves to the construction of an enclosure by a person with modest construction skills. The following U.S. patents disclose a variety of corner located fittings for assembled enclosures: U.S. Pat. Nos. 2,947,566; 3,986,317; 4,703,969, while U.S. Pat. No. 2,080,764 discloses a bracket bent at a right angle to engage a second bracket as does above noted U.S. Pat. No. 4,703,969.

A need exists for enclosure fittings of low costs of manufacture for purchase by a truck owner enabling assembly of a box or bed enclosure on a do-it-yourself basis.

SUMMARY OF THE PRESENT INVENTION

The present invention is embodied in fittings for use in a truck bed or box enclosure.

Insert and socket fittings cooperate at the intersections of enclosure side and end members to engage in a snug manner to limit movement between joined members to a minimum.

An insert fitting serves to removably attach front and rear closure members to the sides of the present enclosure with the sides being equipped with angular socket fittings. The insert fittings on the front and rear closures each have a leg member offset from the major portion of the fitting to define an open area which receives the apex of the angular socket fitting in a manner with limited clearance to provide snug engagement of the fittings. Both types of fittings are formed from plate stock by low cost cutting and forming operations to provide a low cost of manufacture for a set of fittings for a truck bed or box enclosure yet providing an extremely secure and tight enclosure. The remainder of the enclosure is formed from dimension lumber.

Important objectives of the present invention include the provision of a set of metal fittings enabling construction of a truck box or bed enclosure with the fittings produced by low cost manufacturing operations yet providing an enclosure with minimal clearance between the fittings to enhance enclosure rigidity; the provision of truck box enclosure fittings wherein a leg member of an insertable fitting is received within a space defined by an angular socket of the remaining fitting with the apex of the angular socket being received in an elongate opening of the cooperating fitting.

BRIEF DESCRIPTION OF THE DRAWINGS

In the accompanying drawings:

FIG. 1 is a side elevational view of a truck box enclosure provided with fittings embodying the present invention.

FIG. 2 is a vertical sectional view taken along line 2—2 of FIG. 1;

FIG. 3 is a prospective view of a corner of the enclosure provided with fittings embodying the present invention;

FIG. 4 and FIG. 5 are elevational views of an insert fitting and a socket fitting of the present invention; and FIG. 6 is a plan view of an angular socket fitting in place on an enclosure member.

DETAILED DESCRIPTION OF THE PREFERRED EMBODIMENT

With continuing attention to the drawings, wherein applied reference numerals indicate parts similarly hereinafter identified, the reference numeral 1 indicates generally a pickup truck having a box 2 in which may be transported various items.

Indicated generally at 3 is a truck box enclosure for use in confining certain cargos which enhances the load carrying capability of the truck. While reference numeral 3 indicates generally a truck box enclosure, it will be understood that the following described invention may be equally useful in the assembly of an enclosure for a truck bed. A tailgate is at 4.

A more or less typical truck box enclosure includes side posts at 5, each being insertable within front and rear openings formed in the side of the truck box. Side rails at 6 are carried by the posts and join thereto by fasteners as later described. With attention to FIG. 2, an end closure is indicated generally at 7 and may be typical of the remaining or forward closure of the enclosure 3. End closure 7 includes cross members 8, each affixed at their ends to uprights at 9.

End closure 7 is provided with insert fittings at 11 with each of the fittings including a base 12 apertured at 13 to receive threaded fasteners 14. Insert fitting 11 includes a leg member 15 which is spaced from base 12 of the fitting to define an opening 16 which is orientated vertically and of elongate shape. As viewed in FIG. 4, leg member 15 has a width indicated at X.

An angular socket fitting at 18 includes a base 20 apertured at 21 for reception of threaded fasteners which, in similarity to fitting 11, additionally serve to join horizontal and vertical enclosure members to facilitate assembly of enclosure 3. Angular socket 18 is formed from plate stock in continuing similarity to insert fitting 11, with an upright socket defined by converging walls 22, which as viewed in FIG. 6, define an acute included angle of approximately 60°. A triangular socket 23 is formed with the base of the triangle being defined by an enclosure member such as a horizontal rail member 6. Threaded fasteners at 24 join the angular socket fitting 18 to the enclosure member with the threaded fasteners additionally serving to join the member 6 to an upright post 5 if so desired. With continuing attention to FIG. 6, it will be seen that a medial plane P bisects socket 23 and the apex 25 of converging socket walls 22 with the horizontal distance at Y between apex 25 and a surface of enclosure member 6 being only somewhat greater than dimension X of FIG. 4 to receive leg member 15 in a snug manner. Accordingly, horizontal displacement of enclosure member 7, equipped with insert fittings 11, is limited by contact of an edge 27 of the insert fitting with apex 25 and by contact of an edge 28 of the insert fitting with enclosure member 6. Leg member 15 is beveled to facilitate insertion within triangular socket area 23 of the angular socket.

While I have shown but one embodiment of the invention, it will be apparent to those skilled in the art that the invention may be embodied still otherwise without departing from the spirit and scope of the invention.

Having thus described the invention, what is desired to be secured by a Letters Patent is:

I claim:

1. A fitting structure for attachment to side and end members to enable assembly of an enclosure about a cargo carrying area of a vehicle, said fitting structure comprising, a substantially planar insert fitting for attachment to a first member of the enclosure, said fitting being formed entirely of plate stock having an elongate opening, said insert fitting having a leg member defining a first side of said elongate opening, said fitting having multiple apertures for reception of fasteners, a socket fitting formed entirely from plate stock and having a base for attachment to a second member of the enclosure, intersecting walls defining an acute included angle and integral with said base and, said base formed of two spaced apart substantially equal coplanar portions having a width and length, the portions being connected by a pair of converging walls having a width and length, the length of the walls being less than the length of the portions, the walls form a socket defining an upright socket having a width Y or inserted reception of said leg member, said base defining multiple apertures or the reception of fasteners, said intersecting walls of the socket forming an apex, said apex received in said elongate opening in said insert fitting, and said leg member being of a width X to substantially occupy the width Y of said upright socket lying in a plane bisecting said apex to restrict undesired horizontal movement between joined side and end members.

* * * * *